United States Patent [19]

Nagano

[11] Patent Number: 5,018,613
[45] Date of Patent: May 28, 1991

[54] INTERMEDIATE PLATE POSITIONING MECHANISM FOR TWIN CLUTCH

[75] Inventor: Tamio Nagano, Neyagawa, Japan

[73] Assignee: Kabushiki Kaisha Daikin Seisakusho, Osaka, Japan

[21] Appl. No.: 378,676

[22] Filed: Jul. 12, 1989

[30] Foreign Application Priority Data

Aug. 10, 1988 [JP] Japan ............................ 63-106233[U]

[51] Int. Cl.$^5$ ............................................. F16D 13/75
[52] U.S. Cl. .............................. 192/70.25; 192/111 A
[58] Field of Search ......................... 192/70.25, 111 A; 188/71.8, 196 P

[56] References Cited

U.S. PATENT DOCUMENTS 3,086,634 4/1963 Reed ............................ 192/111 A X
4,339,023 7/1982 Maycock .......................... 192/70.25
4,640,400 2/1987 Nakane et al. ..................... 192/70.25

FOREIGN PATENT DOCUMENTS 63-27724 2/1988 Japan .
1456149 11/1976 United Kingdom ............ 192/111 A Primary Examiner—Richard Lorence
Attorney, Agent, or Firm—Armstrong, Nikaido, Marmelstein, Kubovcik, & Murray

[57] ABSTRACT

An intermediate plate positioning mechanism for a twin clutch equipped with an annular intermediate plate inside a clutch cover. In this mechanism; a hole piercing in an axial direction is made on an outer peripheral part of the intermediate plate, a slide member is disposed in the hole, a first coil spring is compressedly installed between the slide member and a flywheel, a second coil spring is compressedly installed between the slide member and a pressure plate, a friction load between the slide member and an inner peripheral surface of the hole is settled within a region where the slide member slides along the hole in an axial direction when a difference between spring loads of the both coil springs becomes larger than a prescribed setting value at a time of clutch engagement, and stops at a position at which loads of both springs become equivalent, and at the same time the friction load is settled within a region where the slide member moves integrally with the intermediate plate at a time of clutch disengagement.

8 Claims, 3 Drawing Sheets

INTERMEDIATE PLATE POSITIONING MECHANISM FOR TWIN CLUTCH

BACKGROUND OF THE INVENTION

1. Industrial Useful Field

This invention relates to an intermediate plate positioning mechanism for a twin clutch having two clutch discs with an intermediate plate sandwiched therebetween.

2. Prior Art and its Problem

As illustrated in FIG. 8, a conventional twin clutch 100 is generally composed of a first clutch disc 103 pressed on a flywheel 101, an annular intermediate plate 104 pressing the first clutch disc 103 on the flywheel 101, a second clutch disc 105 pressed on a back face of the intermediate plate 104 and an annular pressure plate 106 pressing the second clutch disc 105 on the back face (right side of FIG. 8) of the intermediate plate 104, which are all housed respectively concentrically in an inside of a clutch cover 102 secured to an outer peripheral part of the flywheel 101. Various positioning mechanisms at a time of clutch disengagement have been proposed for the intermediate plate 104 disposed between the first clutch disc 103 and the second clutch disc 105.

A construction is well known, wherein a stopper pin 112 extending in a longitudinal direction (lateral direction of FIG. 8) is passed through a hole 111 on an outer peripheral part of the intermediate plate 104. A supporting part 120 for contacting with the stopper pin and secured to the flywheel 101 in such a manner as covering an outer peripheral side of the pressure plate 106 is provided. The flywheel 101 is connected to the intermediate plate 104 by an elastic strap 121. The stopper pin 112 is elastically fitted in a hole of an annular stopper spring 114 in such a manner that the stopper pin 112 is able to slide only backward in relation to the stopper spring 114. Stopper spring 114 is held between the elastic strap 121 and the intermediate plate 104, as illustrated in an upper part of FIG. 8 for example (Japanese Patent Publication No. 63-27724, for example).

According to the above-mentioned structure, a backward movement of the intermediate plate 104 is restricted by the stopper pin 112 so that a prescribed return stroke L (backward movement of the intermediate plate 104) can be correctly insured at the backside of the intermediate plate 104.

However, a friction facing 105a of the second clutch disc 105 is apt to wear out earlier than a friction facing 103a of the first clutch disc 103 because the facing 105a rubs against the pressure plate 106 forming a rotating member in advance of the friction facing 103a at a time of clutch engagement. Consequently, when the clutch is kept operating under a state where only the friction facing 105a is excessively worn out, a clearance (a distance between the intermediate plate 104 and the friction facing 105a) becomes larger than an initial dimension so that this clearance does not correspond with the return stroke L.

OBJECT OF THE INVENTION

An object of the invention is to provide an intermediate plate positioning mechanism in a clutch having two or more discs, in which uniform clearances can be obtained from both friction facings even when any one of the friction facing of the clutch discs is worn out earlier than the friction facing on another of the clutch discs.

COMPOSITION OF THE INVENTION

(1) Technical measure

In order to solve the foregoing problem, this invention provides an intermediate plate positioning mechanism for a twin clutch equipped with a first clutch disc pressed on a flywheel, an annular intermediate plate pressing the first clutch disc on the flywheel, a second clutch disc pressed on a back face of the intermediate plate, and an annular pressure plate pressing the second clutch disc on the back face of the intermediate plate, respectively concentrically inside a clutch cover secured to an outer peripheral part of a flywheel; characterized by that a hole extending in an axial direction of the clutch is made on an outer peripheral part of the intermediate plate, a slide member is disposed in the hole, a first coil spring is compressedly installed between the slide member and the flywheel, a second coil spring is compressedly installed between the slide member and the pressure plate, a friction load is provided between the slide member and an inner peripheral surface of the hole within a region where the slide member slides along the hole in the axial direction when a difference between spring loads of such coil springs becomes larger than a prescribed setting value at the time of clutch engagement, and the friction load stops at a position at which loads of such springs become equivalent and, at the same time, the friction load is within a region where the slide member moves integrally with the intermediate plate at the time of clutch disengagement.

(2) Function

When any one of friction facing of the first and second clutch discs is worn out excessively to cause a difference between the spring load of the first coil spring and the spring load of the second coil spring, at the time of clutch engagement, is larger than the prescribed value, the slide member slides along the hole and stops at a position where the spring loads of the first coil spring and the second coil spring balance each other.

When the pressure plate is kept apart from the friction facing of the second clutch disc in the clutch engagement and disengagement strokes, the intermediate plate moves integrally with the slide member and stops at a place apart from both the first clutch disc and the second clutch disc with specified clearances left therebetween.

DETAILED DESCRIPTION OF THE INVENTION

Figures 1, 1A:
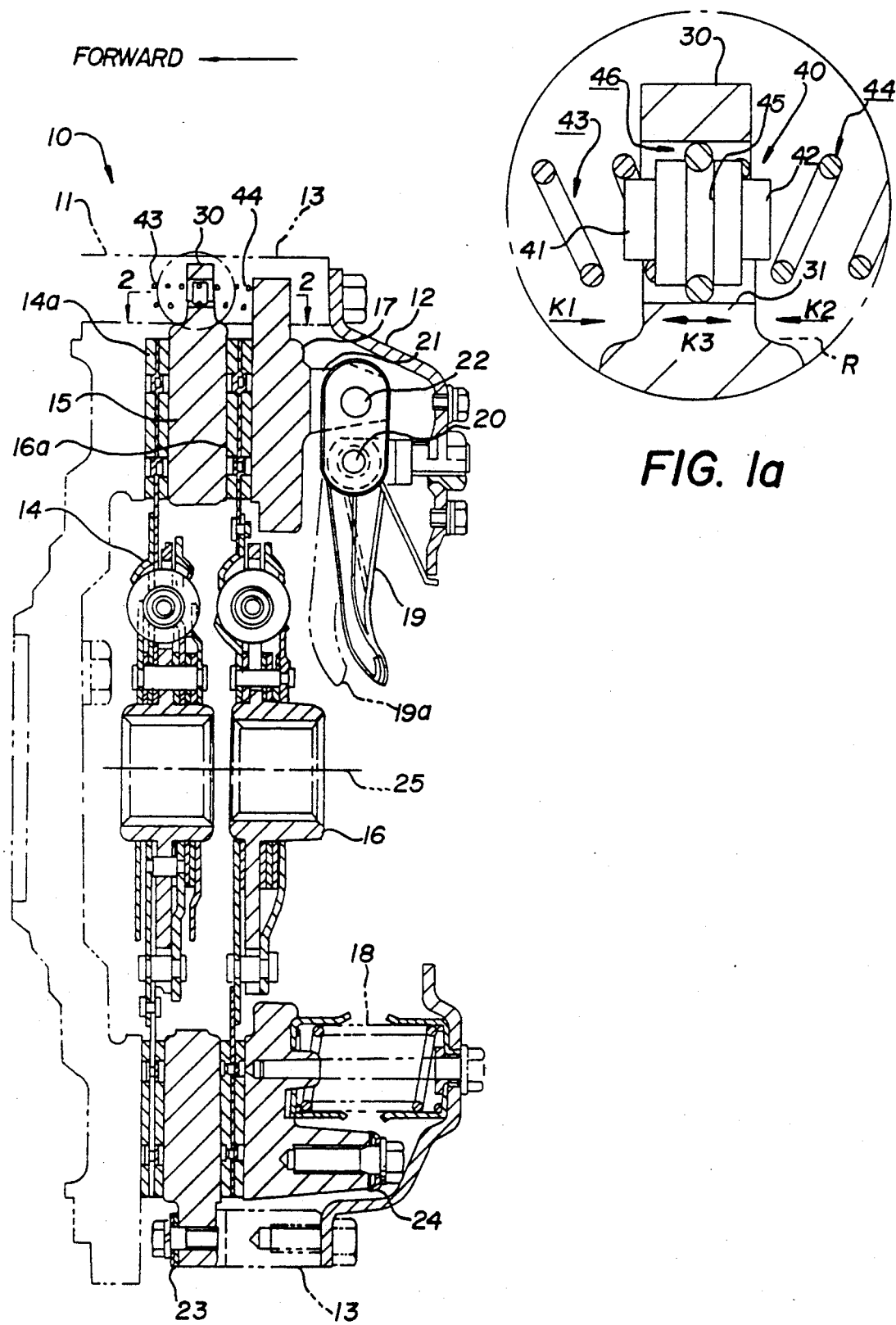
FIG. 1 is a sectional view of a twin clutch of the present invention.
FIG. 1A is an enlarged sectional view of the portion of FIG. 1 in a circle.

FIG. 1 shows the vertical sectional view of a twin clutch 10 to which the present invention is applicable, and a left side of FIG. 1 is assumed as a front side.

11 is a flywheel which is connected to an engine through a crank shaft, not shown, positioned at an outside to the left of the figure. An outer peripheral part of a clutch cover 12 is secured through a spacer 13 to an outer peripheral part of the flywheel 11. A first clutch disc 14, an annular intermediate plate 15, a second clutch disc 16 and an annular pressure plate 17 are installed concentrically inside the clutch cover 12 in this order from the flywheel 11 side, respectively. The first and second clutch discs 14, 16a on their, respectively, outer peripheral parts. A spring force of a coil spring 18 pressing the pressure plate 17 forward causes the pressure plate 17 to press the friction facing 16a on the intermediate plate 15, and to cause the intermediate plate 15 to press the friction facing 14a on the flywheel 11. Release lever 19 is arranged in a radial direction, and is freely rotatably supported by pin 20 of a release lever supporting mechanism. The radial outside end portion of lever 19 is rotatably connected to back face side projection 21 of the pressure plate 17 through pin 22. Elastic straps 23, 24 of leaf spring, each having one end secured, respectively, to a front face of outer peripheral part of the intermediate plate 15 and the back face side projection of the pressure plate 17, and the other ends thereof secured to an inner peripheral face of the clutch cover 12. The intermediate plate 15 and the pressure plate 17 rotate integrally with the clutch cover 12. First and second clutch discs 14, 16 are spline fitted onto a clutch shaft 25 (only its center line being shown), which serves as an input shaft of transmission, not shown, and slide freely in a longitudinal direction of such shaft.

The intermediate plate 15 includes six (only one being shown) radially outwardly protruding integral projections 30, at 60° intervals, for example, in a circumferential direction. Hole 31, FIG. 1A, passes in an axial direction of the clutch through each projection 30. Slide member 40, FIG. 1A, fits in each hole 31 and is freely slidably in a longitudinal direction of the hole.

Slide member 40 is acylindrical metal member having small diameter portions 41, 42 at its opposite ends. One end of first and second coil spring 43, 44 are held on these small diameter portions 41, 42.

First coil spring 43 is compressedly positioned between slide member 40 and flywheel 11 and urges the slide member 40 toward the rear pressure plate 17 side. Second coil spring 44 is compressedly positioned between slide member 40 and pressure plate 17 and urges the slide member 40 toward the front flywheel 11 side.

A groove 45, continuous in the circumferential direction, is provided on an outer peripheral surface of the slide member 40. O-ring 46 is fitted into the groove 45 in sliding contact with an inner peripheral surface of hole 31. With a spring load K1 of the first coil spring 43, a spring load K2 of the second coils spring 44, a friction member, in the form of an O-ring, which may be metal, between the slide member 40 and the inner peripheral surface of the hole 31 which provides a friction load K3 between slide member 40 and the inner surface of hole 31, a resistance R to relative movement between intermediate plate 15 and slide member 40 when the pressure plate is isolated from the friction facing 16a of the second clutch disc 16 during clutch engaging and disengaging strokes and a magnitude X1 of the force required for sliding and setting the slide member 40 along the hole 31 at the time of clutch engagement; such values are within the following ranges:

At the time of clutch engagement: $K3 < |K1-K2|$, provided that $|K1-K2| \geq X1$ and $X1 \neq 0$ At the time of clutch disengagement: $R < K3$ The magnitude X1 of the force required for sliding and setting the slide member 40 along the hole 31 is in a range wherein the intermediate plate 15 does not contact either of the friction facings 14a and 16a after clutch disengagement.

In the clutch engaged state, as illustrated in FIG. 1, the pressure plate 17 presses the friction facing 16a of the second clutch disc 16 against the intermediate plate 15, and the intermediate plate 15 against the friction facing 14a of the first clutch disc 14 and the flywheel 11. The torque of the flywheel 11 is smoothly transmitted through the first and second clutch discs 14, 16 to the clutch shaft 25. In this instance, the slide member 40 stands still at a position where spring forces of the first and second coil springs 43, 44 balance each other.

When a free end of the release lever 19 is pushed forward to a position as indicated by a two-dot chain line 19a in FIG. 1 from the clutch engaged state by operating a clutch engaging/disengaging mechanism, not shown, the release lever 19 swings around the pin 20. The pressure plate 17 is moved rearward, to the right in FIG. 1, by a lever action against a spring force of the coil spring 18. Accordingly, the friction facing 16a leaves the intermediate plate 15 and, at the same time, the compressive force on the second coil spring 44 is weakened. Thus, the force by which the first coil spring 43 urges the slide member 40 backward increases. Moreover, the slide member 40 together with the intermediate plate 15 are integrally burdened with the load of the first coil spring 43, because the friction load K3 of the slide member 40 is larger than the return resistance R at the time when the pressure plate 17 is isolated from the friction facing 16a of the second clutch disc 16.

Figure 2:
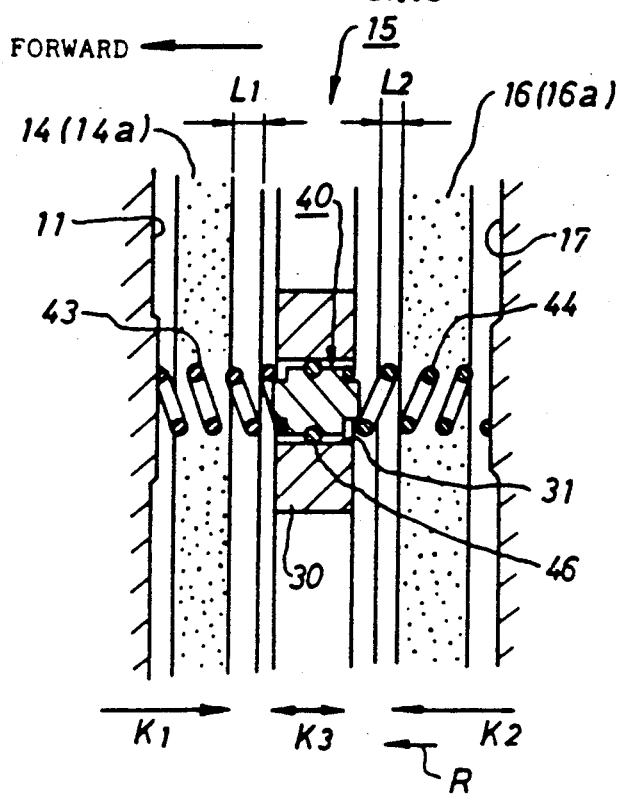
FIG. 2 is a schematic sectional view showing a disengaged state of the twin clutch of this invention taken on a line 2—2 of FIG. 1.

Therefore, as illustrated in FIG. 2, the pressure plate 17 moves backward, to the right in FIG. 2, separating from the friction facing 16a of the second clutch disc 16, the friction facing 16a separates from the intermediate plate 15, and the intermediate plate 15 separates from the friction facing 14a of the first clutch disc 14. Thus, the clutch is disengaged with prescribed clearances L1 and L2 between the friction facing 14a and the intermediate plate 15 and between the intermediate plate 15 and the friction facing 16a, respectively.

In the event when only the friction facing 16a of the second disc 16 is worn out, during operation of the clutch, for example, the spring load K2 of the second coil spring 44 increases relative to the spring load K1 of the first coil spring 43 in proportion to the decrease in clearance between the intermediate plate 15 and the pressure plate 17 at the time of clutch engagement (FIG. 1). When the difference between the spring load K1 and the spring load K2, at the time of clutch engagement, becomes larger than the above-mentioned setting value X1, the slide member 40 moves forward along the hole 31, in proportion, as the load K2 increases and stops at a position where the spring load K1 rebalances with the spring load K2. Because the friction load K3 is set larger than the return resistance R of the intermediate plate 15 at the time of clutch disengagement, the slide member 40 moves together and integrally with the intermediate plate 15 while the pressure plate 17 is leaving from the friction facing 16a, as shown by FIG. 2, so that intermediate plate 15 and slide member 40 stop at a position where the spring loads K1 and K2 of the first coil spring 43 and second coil spring 44 balance each other. Consequently, the intermediate plate 15 stops at a position separated from both the friction facing 14a of the first clutch disc 14 and the friction facing 16a of the second clutch disc 16 with prescribed relative clearances L1 and L2 left therebetween.

The slide member 40 moves in the opposite direction in the hole 31 to the direction described above, to provide the same effect as described above, even if only the friction facing 14a of the first clutch disc 14 is excessively worn out.

According to the present invention, as described above, the friction load K3 between the slide member 40 and the inner peripheral surface 31 of the hole 31 is settled within the region where the slide member 40 slides along the hole 31 in the axial direction when the difference between spring loads K1 and K2 of the first coil spring 43 and the second coil spring 44, respectively, becomes larger than the prescribed setting value at the time of clutch engagement and stops at the position at which the loads K1, K2 of springs 43, 44 balance each other, and, at the same time, the friction load is settled within the region where the slide member 40 moves integrally with the intermediate plate 15 at the time of clutch disengagement. Accordingly, under the clutch disengaged state, the intermediate plate 15 stops at the position separated from both the friction facing 14a of the first clutch disc 14 and the friction facing 16a of the second clutch disc 16 with prescribed relative clearances L1 and L2 left therebetween as illustrated by FIG. 2, no matter whether the amount of wear of the friction facings 14a and 16a of the clutch discs 14 and 16 are uniform or not.

Therefore, the prescribed relative clearances L1 and L2 can always be obtained according to the present invention, even if the wear amounts of the friction facings 14a and 16a of the first and second clutch discs 14 and 16 of the twin clutch 10 are not uniform, so that highly reliable engagement and disengagement operations can be carried out.

Figure 3:
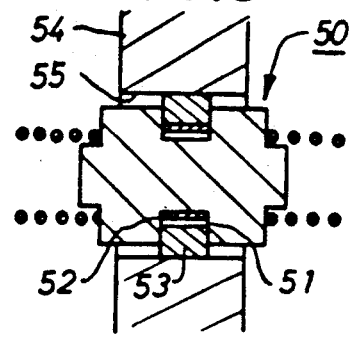
FIG. 3 is a schematic side view of a slide member showing another embodiment.
Figure 4:
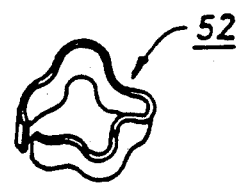
FIG. 4 is an oblique view of a wave-form C-ring applicable to the slide member of FIG. 3.
Figure 5:
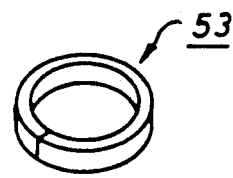
FIG. 5 is an oblique view of an elastic C-ring applicable to FIG. 3.

As seen from another embodiment illustrated in FIG. 3 through FIG. 5, a structure may be employed wherein a groove 51 having a rectangular section continuous in the circumferential direction is provided at an intermediate portion of an outer peripheral surface of a slide member 50, a wave-form C-ring 52 having continuously changing radii is fitted onto the groove 51, an elastic C-ring 53, which may be of metal, is further fitted onto an outer periphery of the wave-form C-ring to cause an outer peripheral surface of the elastic C-ring 53 to slidingly contacts with a hole 55 of an intermediate plate 54. In the foregoing structure, the wave-form C-ring 53 functions as a spring member having a radial elasticity to press the elastic C-ring 53 on an inner peripheral surface of the hole 55. The structure as illustrated in FIG. 3 through FIG. 5 is employed in case when a larger friction load K3 between the elastic C-ring 53 of the slide member 50 and the inner peripheral surface of the hole 55 is required.

Figure 6:
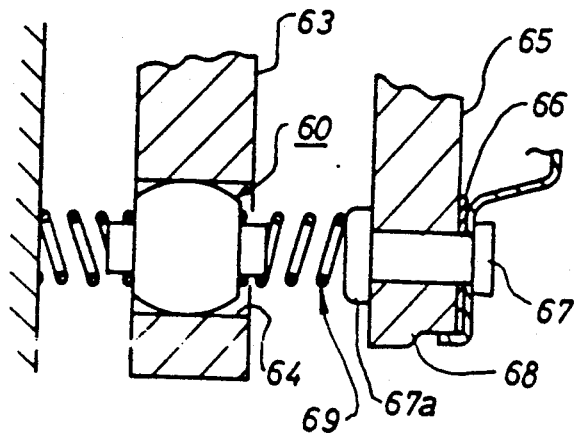
FIG. 6 is a partially sectional schematic view of a twin clutch showing a further another embodiment of the invention.

A slide member 60 an outer peripheral part of which swells in its radial direction to be formed into a barrel shape, is shown in a further another embodiment as illustrated by FIG. 6. The structure of FIG. 6 is employed in case where the friction load K3 between the slide member 60 and an inner peripheral surface of a hole 64 of an intermediate plate 63 may be comparatively small. In FIG. 6, 65 is a pressure plate, 66 is an elastic strap of the pressure plate 65, and 67 is a rivet for fastening the elastic strap 66 to a projection 68 of the pressure plate 65 and its head 67a serves also as a seat for a second coil spring 69.

Figure 7:
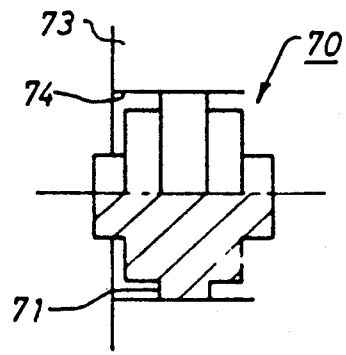
FIG. 7 is a partially fragmental schematic side view of the slide member showing a still further another embodiment of the present invention.
Figures 8, 8A:
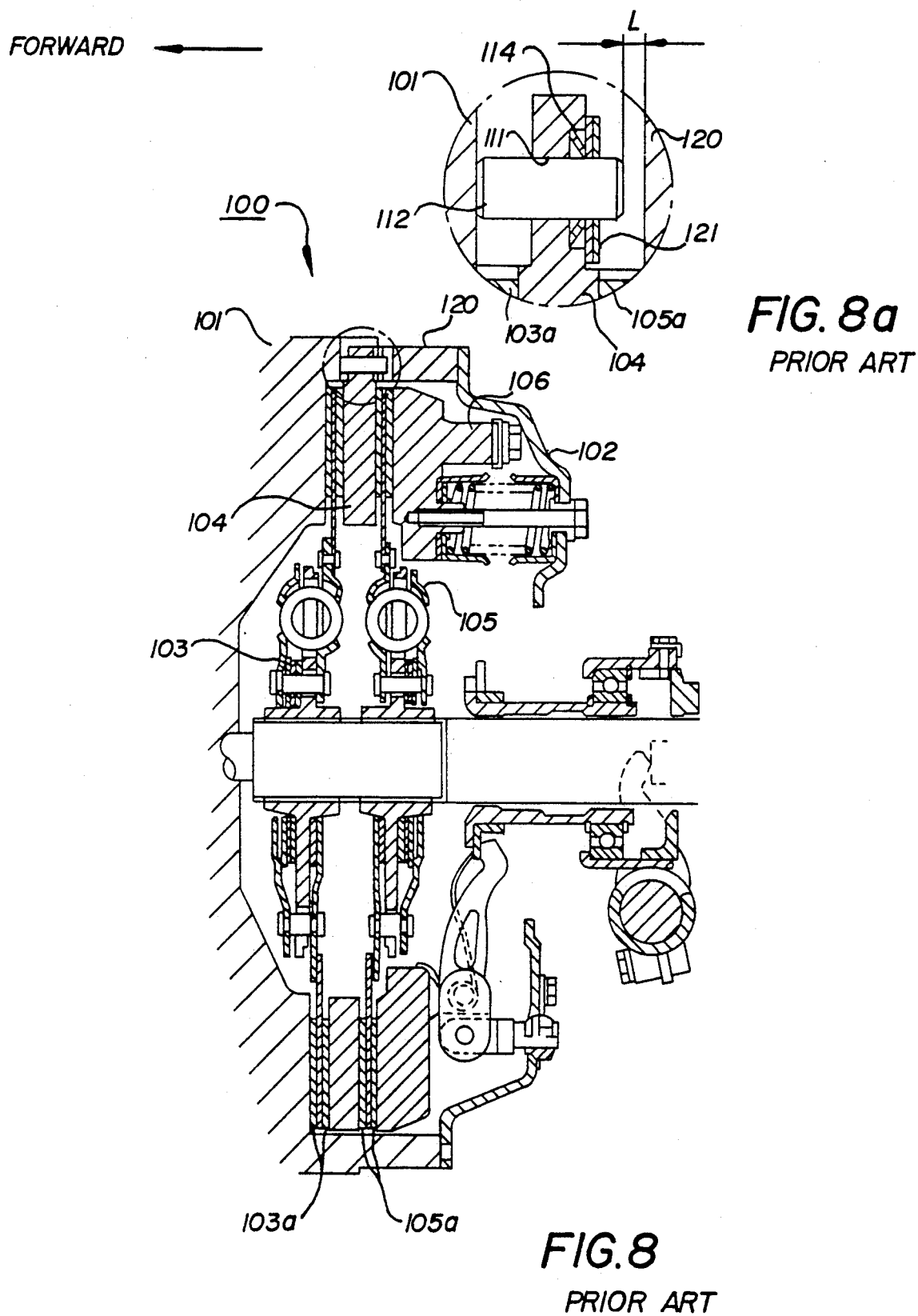
FIG. 8 is a sectional view of a twin clutch showing a conventional intermediate plate positioning mechanism.
FIG. 8A is an enlarged sectional view of the portion of FIG. 8 in a circle.

As seen from a still further another embodiment illustrated in FIG. 7, a structure may be employed wherein a slide member 70 concentrically and integrally having a large diameter portion 71 at its outer peripheral part is used and an outer peripheral surface of the large diameter portion 71 of the slide member 70 is made slidingly contact with an inner peripheral surface of a hole 74.

What is claimed is:

1. In a twin clutch equipped with a first clutch disc pressed on a flywheel, an annular intermediate plate pressing the first clutch disc on the flywheel, a second clutch disc pressed on a back face of the intermediate plate, and an annular pressure plate pressing the second clutch disc on the back face of the intermediate plate, respectively concentrically inside a clutch cover secured to an outer peripheral part of a flywheel; an intermediate plate positioning mechanism for the clutch, in which a hole extends in an axial direction of said clutch through an outer peripheral part of said intermediate plate, a slide member is disposed in said hole, a first coil spring is installed with a first coil spring compressive load between said slide member and said flywheel, a second coil spring is installed with a second coil spring compressive ember between said slide member and said pressure plate, a friction member between said slide member and an inner peripheral surface of said hole for providing a friction load between said slide member and said inner surface of said hole along a length of said inner peripheral surface of said hole where said slide member slides when a difference between said first coil spring compressive load and said second coil spring compressive load becomes larger than a prescribed value at a time of clutch engagement, said friction load stopping at a position along said length at which said first coil spring and said second coil spring compressive loads become substantially equal, said slide member moving integrally with said intermediate plate while said clutch is being disengaged.

2. An intermediate plate positioning mechanism for a twin clutch a set forth in claim 1, which satisfies the following conditions:

a) At the time of clutch engagement;

$$K3 < |K1 - K2|;$$

provided that $|K1-K2| \geq X1$ and $X1 \neq 0$, and b) At the time of clutch disengagement;

$$R < K3$$

where:

K1 is the compressive load of the first coil spring;
K2 is the compressive load of the second coil spring;

K3 is the friction load between the slide member and the inner peripheral surface of the hole;

R is the return resistance of the intermediate plate at the time when the pressure plate is isolated from the friction facing of the second clutch disc during clutch engaging and disengaging strokes; and X1 is the magnitude of the force required for sliding and setting the slide member along the hole at the time of clutch engagement.

3. An intermediate plate positioning mechanism for a twin clutch as set forth in claim 1 in which said slide member is a cylindrical ember made of metal concentrically having small diameter portions for fixing coil springs at both ends thereof.

4. An intermediate plate positioning mechanism for a twin clutch as set forth in any one of claim 1 through claim 3, in which said slide member includes a groove continuous in a circumferential direction at its outer peripheral part and a metal member fitting onto said groove to slidingly contact with the inner peripheral surface of said hole.

5. An intermediate plate positioning mechanism for a twin clutch as set forth in claim 4, in which said metal member is an O-ring fitting onto said groove.

6. An intermediate plate positioning mechanism for a twin clutch as set forth in claim 4, in which said metal member is an assembly of a C-ring fitting onto said groove and a wave-form C-ring disposed between the C-ring and said groove.

7. An intermediate plate positioning mechanism for a twin clutch as set forth in any one of claim 1 through claim 3, in which said slide member is a monoblock barrel-shaped member having a radially swelling outer peripheral part for slidingly contacting with the inner peripheral surface of the hole.

8. An intermediate plate positioning mechanism for a twin clutch as set forth in any one of claim 1 through claim 3, in which said slide member integrally includes a large diameter portion slidingly contacting with the inner peripheral surface of said hole.

* * * * *